(12) United States Patent
Kanning

(10) Patent No.: US 9,500,235 B2
(45) Date of Patent: Nov. 22, 2016

(54) CLIP INSERT FOR DRIVE COUPLER

(71) Applicant: VITA-MIX CORPORATION, Olmsted Township, OH (US)

(72) Inventor: David Kanning, Valley City, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 32 days.

(21) Appl. No.: 14/211,414

(22) Filed: Mar. 14, 2014

(65) Prior Publication Data

US 2014/0270929 A1 Sep. 18, 2014

Related U.S. Application Data

(60) Provisional application No. 61/788,127, filed on Mar. 15, 2013.

(51) Int. Cl.
| | |
|---|---|
| *F16D 1/10* | (2006.01) |
| *F16D 1/108* | (2006.01) |
| *F16D 1/06* | (2006.01) |

(52) U.S. Cl.
CPC ............... *F16D 1/10* (2013.01); *F16D 1/108* (2013.01); *F16D 2001/062* (2013.01); *F16D 2001/102* (2013.01); *F16D 2001/103* (2013.01); *Y10T 403/604* (2015.01)

(58) Field of Classification Search
CPC .. A47J 43/0716; A47J 43/085; A47J 43/046; A47J 43/07; F16B 21/16; F16B 21/18; F16B 2/20; Y10T 403/7026; Y10T 403/7032; Y10T 403/7033; Y10T 403/7035
See application file for complete search history.

(56) References Cited

U.S. PATENT DOCUMENTS

| | | | |
|---|---|---|---|
| 2,345,749 A | 4/1944 | Hohwart | |
| 2,370,725 A | 3/1945 | Gordon | |
| 2,639,904 A | 5/1953 | McMaster et al. | |
| 2,670,227 A | 2/1954 | Green | |
| 2,676,506 A | 4/1954 | Schultz | |
| 2,716,564 A | 8/1955 | Lofqvist | |
| 3,233,497 A * | 2/1966 | McCormick | 411/517 |
| 3,388,934 A | 6/1968 | Chapman, Jr. et al. | |
| 3,543,605 A | 12/1970 | Sherman | |
| 4,256,010 A * | 3/1981 | Petrie | 411/518 |
| 4,264,216 A | 4/1981 | Stansbury, Jr. | |
| 4,750,878 A * | 6/1988 | Nix et al. | 384/296 |
| 4,783,173 A | 11/1988 | Artin | |
| 5,131,785 A * | 7/1992 | Shimazaki | 403/326 |
| 5,365,807 A | 11/1994 | Darrah et al. | |
| 5,674,026 A | 10/1997 | Ishibashi et al. | |

(Continued)

FOREIGN PATENT DOCUMENTS

| | | | | |
|---|---|---|---|---|
| EP | 0754602 | * | 1/1997 | |
| WO | WO 9638333 A1 | * | 12/1996 | ............... B62D 1/16 |

OTHER PUBLICATIONS

Copenheaver, Blaine, International Search Report and Written Opinion, PCT/US2014/027819, Jul. 3, 2014, International Search Authority/USA.

*Primary Examiner* — Jonathan Masinick
(74) *Attorney, Agent, or Firm* — McDonald Hopkins LLC

(57) ABSTRACT

A coupler assembly is shown and described. The coupler assembly may include an insert, where the insert comprises an aperture and a plurality of clips, each clip comprising a clip body and a spring tab. The coupler assembly may also include a coupler body having a core adapted to receive the insert.

19 Claims, 3 Drawing Sheets

(56) References Cited

U.S. PATENT DOCUMENTS

| | | |
|---|---|---|
| 7,387,269 B2 | 6/2008 | Mally |
| 7,566,186 B2 * | 7/2009 | Katz et al. .................... 403/293 |
| 2004/0253050 A1 * | 12/2004 | Eidam .......................... 403/315 |
| 2006/0275075 A1 | 12/2006 | Katz et al. |

* cited by examiner

CLIP INSERT FOR DRIVE COUPLER

CROSS-REFERENCE TO RELATED APPLICATION

This application claims priority to U.S. Provisional Application No. 61/788,127 entitled "CLIP INSERT FOR DRIVE COUPLER," filed on Mar. 15, 2013, which is hereby incorporated by reference in its entirety.

FIELD

The present teachings generally relate to an improved manner by which a blender drive coupler assembly engages with and is secured to the motor's drive shaft.

BACKGROUND

Blenders or food processors have a blade or blades which are positioned in a container or pitcher and which are driven by a motor. Traditionally, a drive coupler is used to couple the shaft of the motor to the shaft carrying the blade.

Presently, a spring clip within the drive coupler is sometimes used to prevent the motor shaft from disengaging the coupler in the axial direction.

Using a spring clip to secure the motor shaft to the drive coupler allows for the drive coupler to be more easily and quickly removed from and attached to the shaft of a motor.

The force exerted by a single spring clip, however, may cause misalignment between the motor shaft and blender shaft. That misalignment may cause diminished performance and premature part failure.

SUMMARY

A coupler assembly is shown and described. The coupler assembly may include an insert, where the insert comprises an aperture and a plurality of clips, each clip comprising a clip body and a spring tab. The coupler assembly may also include a coupler body having a core adapted to receive the insert.

A coupler assembly may include an insert comprising a core adapted to receive an insert body, and an insert body inside the core, the insert body having an aperture sized and shaped for close-fitting engagement with a shaft, the insert body further comprising a plurality of clips arranged generally symmetrically or equidistant from each other, each clip comprising a clip body and a spring tab, each spring tab having an outer and an inner surface, each spring tab extending in an outwardly direction from the clip body, each clip having a spring-like quality. The coupler assembly may also include a coupler body comprising a cap portion and a stem portion, wherein the stem portion is sized for close-fitted engagement with the insert.

A coupler assembly may include a coupler body comprising a cap configured to accept a shaft of a blender blade and a core. The coupler assembly may also include a coupler insert comprising at least one fixed clip to selectively engage with a shaft of a blender motor and an insert body operatively engaged with the core of the coupler body.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

Figure 1:
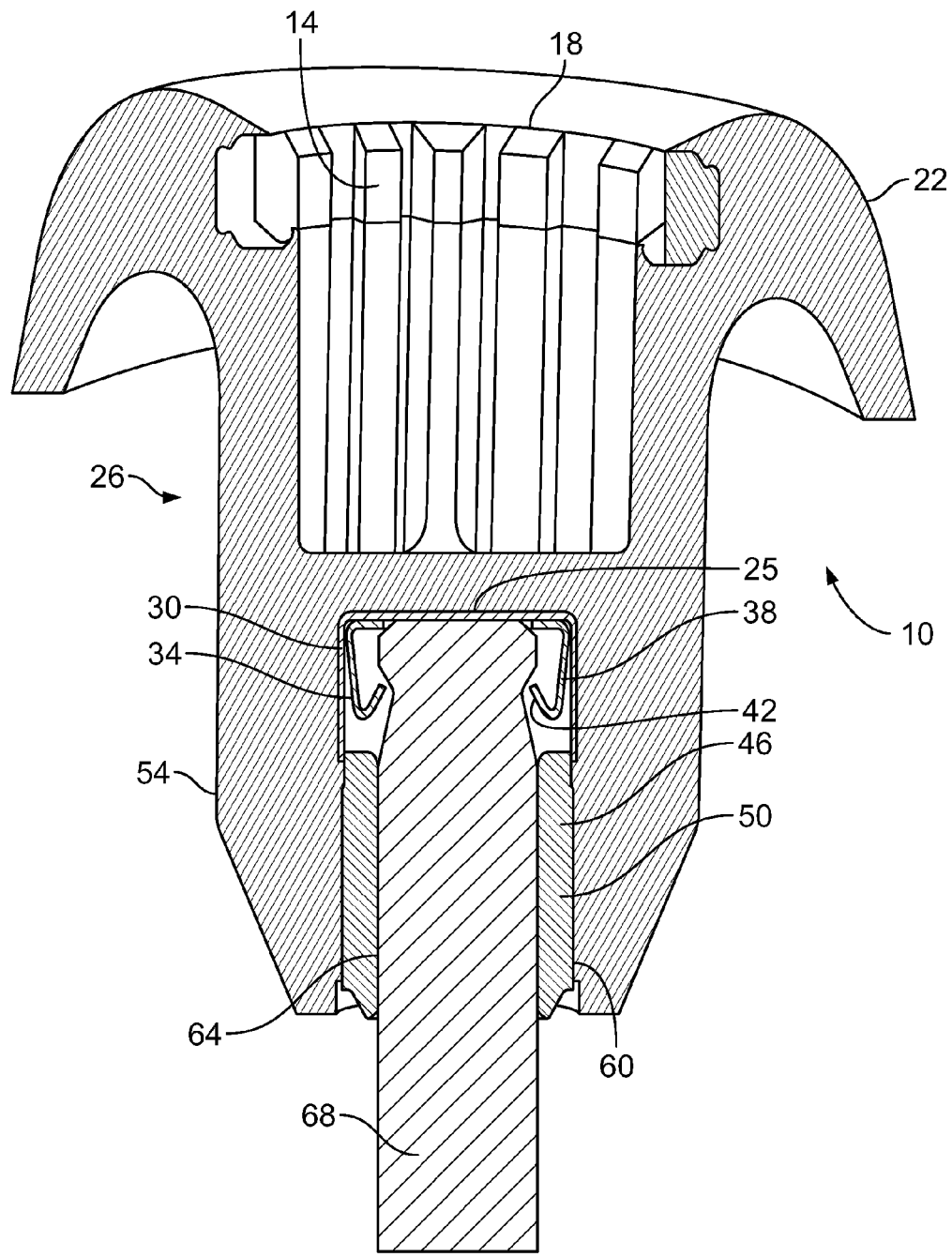
FIG. 1 is a cross-sectional view of the drive coupler, including the coupler insert, engaged with the motor shaft.

With reference to FIG. 1, an exemplary embodiment of a coupler assembly 10 made in accordance with the present teachings is shown. The coupler assembly 10 may include a coupler body 26 and a coupler insert 50. The coupler insert 50 may be made of a strong material, such as steel or like material.

While the coupler assembly 10 of the present teachings is described here in a blender application, the present teachings are not limited to such applications—it is useful in other applications where two shafts are operatively coupled.

Coupler body 26 may be generally mushroom-shaped and have a cap 22 and a stem 54. The coupler body 26, however, is not limited to the mushroom shape shown and described. The coupler body 26 may be of any appropriate configuration. Cap 22 may include a central opening 18 configured to receive a shaft (not shown) of a blender blade. Thus, in the embodiment shown in FIG. 1, when a blender pitcher is placed on the blender's motor housing, the blade shaft, which depends downwardly from the bottom of the pitcher, may be received in opening 18 of cap 22. By way of a non-limiting example, the central opening 18 may include a plurality of splines 14 generally positioned around the periphery of the central opening 18 or a portion thereof. The splines 14 may be configured to operatively engage with a splined shaft (not shown) of a blender base.

Stem 54 may include a generally hollow core 60, which may be sized for close-fitted, mated engagement with coupling insert 50. The core 60 may be of any appropriate shape to accept the coupling insert 50. By way of a non-limiting example, the core 60 may be generally cylindrical and may accept via insertion the coupling insert 50. The core 60 may be configured to hold the coupling insert 50 such as through friction fit. However, the present teachings are not limited to this configuration; the coupler insert 50 may be engaged with the core 60 in any appropriate manner, e.g., adhering, fastening or the like.

Figure 2:
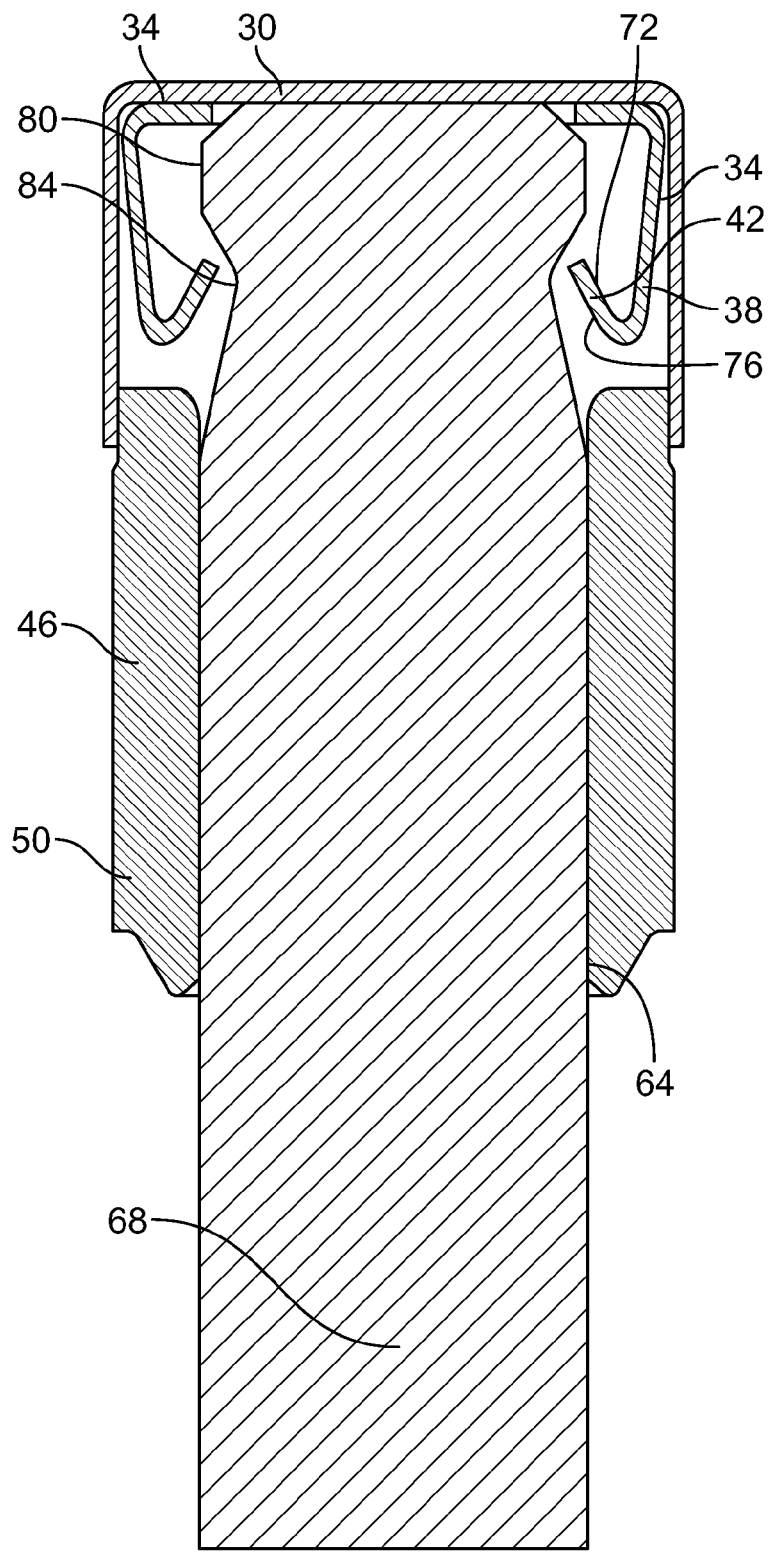
FIG. 2 is a cross-sectional view of the coupler insert engaged with the motor shaft.

As shown in FIG. 2, coupling insert 50 may include a plurality of fixed clips 34 to engage with motor shaft 68. Each clip 34 may include a clip body 38 and spring tab 42. Spring tab 42 may have an outer side 76 and inner side 72. As shown, spring tab 42 may extend in an outwardly direction from, and may form an angle with, clip body 38. As later described, clip 34 may bias—i.e., have a spring-like quality—so that when a force acts on the outer side 76, spring tab 42 may deflect inwardly towards clip body 38. This may reduce the angle between clip body 38 and spring tab 42. When the force is removed, spring tab 42 may deflect outwardly and return to its original position.

Figure 3:
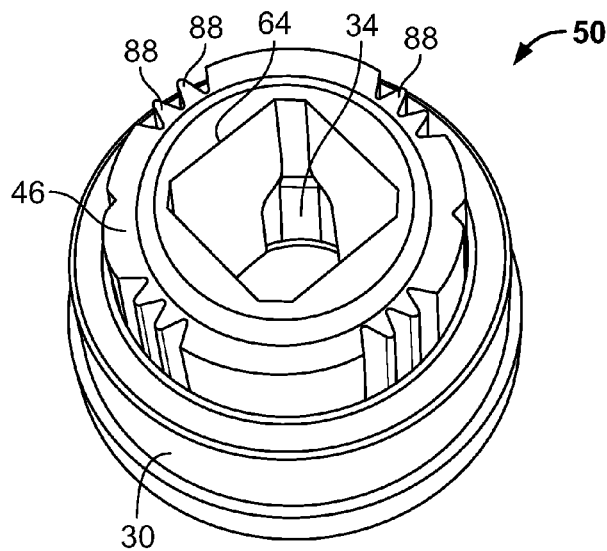
FIG. 3 is a perspective view of the motor-side of the coupler insert.

As shown in FIG. 3, coupling insert 50 may include an insert body 46. Insert body 46 may include an aperture 64 sized and shaped for close-fitting engagement with motor shaft 68. For example, aperture 64 may be generally rectangularly shaped to fit a correspondingly rectangularly shaped motor shaft 68. It should be understood, however, that the shape of the aperture 64 is not limited to that shown and described. Any appropriate shape may be utilized without departing from the present teachings, e.g., generally cylindrical, trapezoidal, etc.

Insert body 46 may include a plurality of insert splines 88 along its outer surface that may improve mating between the insert body 46 and core 60. The insert splines 88 may be of any appropriate shape—they are not limited to that shown. The insert splines 88 may extend along a portion of a circumference of the insert body 46. For example, four insert splines 88 may be generally evenly spaced along the circumference of the insert body 46.

As shown in FIG. 2, coupler insert 50 may include a cap portion 30. The cap portion 30 and insert body 46 may be attached together by any appropriate method or may be monolithically formed together. By way of a non-limiting example, the cap portion 30 may contain a plurality of ribs 96 to operatively engage the insert body 46 and may create compressive forces to hold the two pieces tightly together, e.g., they may form a press fit.

Figure 4:
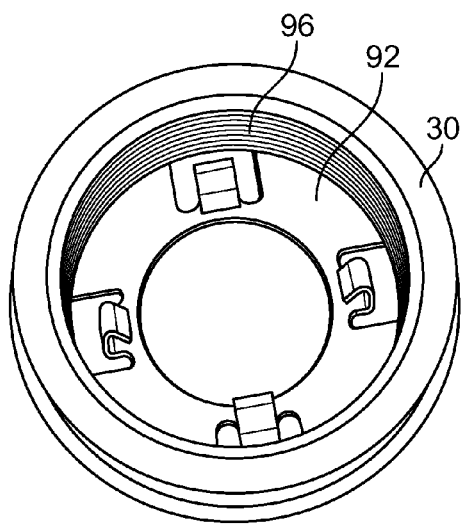
FIG. 4 is a plan view of the cap portion of the coupler insert.
Figure 5:
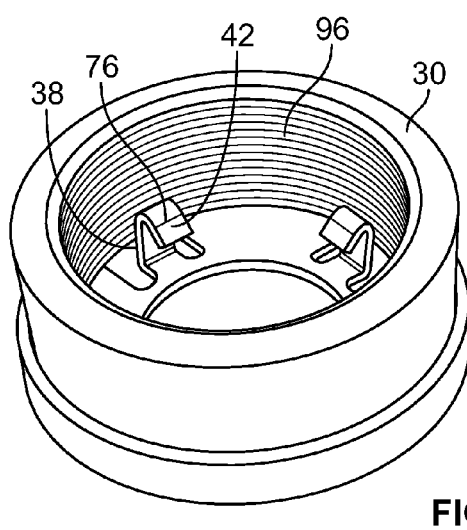
FIG. 5 is a perspective view of the cap portion of the coupler insert.

As shown in FIGS. 4 and 5, clips 34 may be located on a clip retainer 92. Clip retainer 92 may be nested within cap portion 30. Clip retainer 92 may also be attached to cap portion 30 by any appropriate method known in the art. Clips 34 may also be fixed to cap portion 30 or to insert body 46 by any appropriate method, without the use of clip retainer 92.

As shown in FIG. 4, to reduce potential for misalignment between the motor shaft 68 and blender shaft, clips 34 may be arranged generally symmetrically or equidistant from each other. This symmetry may allow and maintain such alignment.

To assemble coupler assembly 10, one may insert coupler insert 50 into core 60 with cap portion 30 nesting at the interior end 25 of core 60.

Coupler insert 50 may be locked in core 60 in various ways. For example, coupler insert 50 may be directly molded into core 60 of coupler body 26. Insert splines 88 provided around the circumference of coupler insert 50 may provide an uneven surface for the molded material to flow into and secure coupler insert 50 within core 60. As another example, tight tolerances between the outside diameter of coupler insert 50 and the diameter of core 60 may create compressive forces to hold the two pieces tightly together, e.g., they may form a press fit. One may also adapt the shape of core 60 to match the insert splines 88 of the insert body 46. In so doing, the insert splines 88 may tightly engage with the splined opening of core 60 and lock the coupler insert 50 in place. The insert splines 88 may be of a generally triangular shape, however, they may also be shaped rectangularly or in other geometric shapes or patterns. One may also weld coupler insert 50 to the core 60 after coupler insert 50 is inserted into core 60.

As shown in FIG. 2, for assembly 10 to be operable with motor shaft 68, shaft 68 is provided with an undercut 84 just below the top peripheral surface 80 thereof. To attach drive coupling assembly 10 to shaft 68, one need only insert shaft 68 into aperture 64 and push downward on drive coupler cap 22. As each clip 34 passes over shaft surface 80, spring tab 42 will be deflected inwardly towards clip body 38. Then, when undercut 84 is reached, spring tab 42 will snap into the undercut area to hold coupler body 26 on shaft 68.

Thereafter, when a blender blade shaft is received in splined opening 18 of coupler cap 22, operation of the motor rotates shaft 68, drive coupler assembly 10, and the blade shaft to operate the blender.

Removal of the drive coupler assembly 10, when necessary, is just as simple. One need only pull on drive coupler cap 22 with sufficient force to remove each spring tab 42 from undercut 84 so that coupler body 26 slides off of shaft 68.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A coupler assembly for a blender device comprising:
   an insert, wherein the insert comprises:
   a polygonal bore operatively receiving a drive shaft of a motor of the blender device; and
   a plurality of clips, each clip comprising a clip body and a spring tab; and
   a coupler body comprising a core adapted to receive the insert, wherein the insert is operatively engaged within the core of the coupler body.

2. The coupler assembly of claim 1, wherein the coupler body further comprises a cap portion and a stem portion, wherein the cap portion comprises a splined central opening and the stem portion comprises the core.

3. The coupler assembly of claim 1, wherein the core is sized for operative engagement with the insert.

4. The coupler assembly of claim 3, wherein operative engagement comprises a friction-fitted engagement.

5. The coupler assembly of claim 1, wherein the insert further comprises an insert body comprising the polygonal bore, wherein the polygonal bore is sized and shaped for operative engagement with the drive shaft.

6. The coupler assembly of claim 5, wherein operative engagement comprises a friction-fitted engagement.

7. The coupler assembly of claim 5, wherein the insert further comprises an insert cap portion and, wherein the plurality of clips is affixed to the insert cap portion.

8. The coupler assembly of claim 7, wherein the insert cap portion comprises a clip retainer, wherein the plurality of clips is located on the clip retainer.

9. The coupler assembly of claim 5, wherein the plurality of clips is affixed to the insert body.

10. The coupler assembly of claim 1, wherein the clips of the plurality of clips are arranged generally symmetrically.

11. The coupler assembly of claim 1, wherein the clips of the plurality of clips are arranged generally equidistant from each other.

12. A coupler assembly comprising:
a coupler body comprising a cap portion comprising an opening configured to accept a shaft of a blender blade, and further comprising a stem comprising a cylindrical core; and
a coupler insert comprising at least one fixed clip extending from the coupler insert, the at least one fixed clip selectively engaged with a shaft of a blender motor, and further comprising an insert body comprising a quadrilateral bore operatively receiving the shaft of the blender motor, and operatively engaged with the core of the coupler body.

13. The coupler assembly of claim 12, wherein the insert body includes a plurality of insert body splines and the core includes a plurality of core splines whereby the insert body splines and the core splines matingly engage with each other.

14. The coupler assembly of claim 12, wherein the insert body is molded into the core.

15. A coupler assembly comprising:
a coupler body comprising:
a cap portion comprising a chamber that is configured to receive a shaft of a blade assembly;
a stem portion comprising a chamber; and
an insert operatively inserted within the chamber, the insert comprising an insert body that operatively receives a quadrilateral shaft of the motor, and an insert cap comprising at least one clip,
wherein the insert body further comprises at least one aperture that, when the insert body and the insert cap are attached, operatively receives the at least one clip.

16. The coupler assembly of claim 15, wherein the aperture of the insert body comprises a quadrilateral bore that operatively receives the shaft of the motor.

17. The coupler assembly of claim 16, wherein the at least one clip extends from the insert cap.

18. The coupler assembly of claim 16, wherein the at least one aperture is disposed at a corner of the quadrilateral bore.

19. The coupler assembly of claim 15, wherein the insert cap comprises a generally cylindrical shape, and wherein the chamber of the stem portion is generally cylindrical.

* * * * *